Patented June 5, 1934

1,961,579

UNITED STATES PATENT OFFICE 1,961,579

COMPOSITION OF MATTER

Bozetech C. Bren, Arlington, N. J., assignor to Du Pont Viscoloid Company, Wilmington, Del., a corporation of Delaware No Drawing. Application February 18, 1931, Serial No. 516,832

6 Claims. (Cl. 106—22)

This invention relates to compositions comprising an aryl alkyl sulphonamid aldehyde resin, i. e. a synthetic resin which is a condensation product of an aryl alkyl sulphonamid and an aldehyde, and in certain embodiments relates to cellulosic plastic compositions comprising such a resin. By cellulosic plastic is meant plastic embodying as a primary constituent, or base, a cellulosic component, for example a cellulose ester (e. g. acetate or nitrate) or a cellulose ether, e. g. benzyl cellulose. More particularly the invention relates to a resin-comprising composition of such character that it may be heated, to the temperatures desirable for use in the practical arts, without the development of flaws, bubbles, voids and other defects.

In the plastics art it is frequently desired, for various reasons, to utilize a plastic containing an aryl alkyl sulphonamid resin, but such plastics are ordinarily of inferior tensile strength and poor heat resistance, and when subjected to temperature (and pressure) operations, such as molding, compositing, press polishing, etc., practiced in the plastics industry, develop flaws, bubbles, voids and other defects which are highly objectionable. I have devised a resinous composition which is itself free from the defects mentioned, and furthermore is of such characteristics that it may be embodied in a cellulosic plastic with advantageous results, and which results in a plastic of various desirable properties incident to the presence of an aryl alkyl sulphonamid resin, but free from those defects, such as a tendency to develop flaws, bubbles, voids, etc. under heat, which have heretofore been considered inevitable accompaniments of efforts to provide a plastic containing an aryl alkyl sulphonamid resin.

One object of the invention is to provide a resinous composition including an aryl alkyl sulphonamid resin which composition will be free from the various defects hereinabove mentioned. A further object is to provide a plastic composition of the general type above referred to, of superior tensile strength and heat resistance. To these ends and also to improve generally upon compositions of the type indicated, and the production thereof, the invention consists in the various matters hereinafter described and claimed.

In general accordance with the invention, I incorporate with the resin a quantity of a urea, for example urea, thiourea, guanidine or any derivative or homologue of urea. The proportion of the urea to the resin may be varied within wide limits but, generally speaking, in consideration of the temperatures and other working conditions, to which the resin might ordinarily be subjected in practice, I have found that not over (and indeed somewhat less than) 50% of the equivalent weight of the urea which is combinable with the total theoretical weight of the aldehydic content of the resin, is entirely adequate, although much less than 50% may be used with beneficial results; and also, of course, an excess of 50% may be used if for any reason it be desired.

In making up resin-containing cellulosic plastics it is desirable to use at least 10% of resin based on the amount of cellulosic ingredient present, i. e. 10 parts of resin per 100 of cellulosic ingredient. The amount of resin may be indefinitely increased, but if the fundamental characteristics of a cellulosic plastic, as distinguished from a resin composition, are to be preserved the per cent of resin is desirably not greater than 150% of resin based on the cellulosic content. In the cellulosic plastics, the urea desirably bears a proportional relation to the resin the same as that indicated above, the fact that the cellulosic ingredient is also present in the plastic not necessitating ratios of urea to resin different from those used in the absence of a cellulosic ingredient.

Without restriction of the invention thereto, the following will serve as examples of the invention (parts by weight):—

I

Methylene* toluene sulphonamid resin____ 100
Urea_____ 4–16 (preferably 6)

II

Xylene sulphonamid aldehyde resin_____ 34
Urea_____ 3–6 (preferably 3)

III

Toluene sulphonamid aldehyde resin_____ 40
Thiourea_____ 2.5–8 (preferably 4)

IV

Toluene sulphonamid aldehyde resin_____ 35
Guanidine_____ 3–8 (preferably 3)

V

Methylene* toluene sulphonamid resin_____ 30
Urea_____3–6 (preferably 3)
*Methylidene In making up the compositions it is only necesary to thoroughly incorporate the urea with the resin under heat, using, say, a temperature of 150° F. and stirring and heating until the ingredients are thoroughly mixed. In the above examples the urea is, in accordance with the desired conditions mentioned, from 8% to 50% of the urea which is combinable with all of the aldehydic content which might otherwise be released from the composition when it is later subjected to ordinary working conditions, e. g.

temperatures and pressures up to say 150° C. and up to 100 pounds per square inch.

In embodying the invention in cellulosic plastic compositions, the desired cellulosic ingredient may be compounded with the resin and the urea in any desired way. Conveniently the various ingredients are mixed together on the rolls or in the mixer in the ordinary ways of making cellulosic plastics, the incorporation of the resin and the urea in the cellulosic mass introducing no difficulties, or the use of specialized procedure. As above mentioned the proportion of resin to cellulosic ingredient may be as desired but, by way of specific example merely, cellulosic plastic compositions may be: composition I plus 100 parts of cellulose acetate; composition II plus 100 parts of cellulose nitrate; composition III plus 100 parts of benzyl cellulose; composition IV plus 100 parts of ethyl cellulose; or composition V plus 100 parts of cellulose acetobutyrate. If desired, a plasticizer in addition to the resin (which is itself a plasticizer), may be used; for example, in composition II 8 parts of camphor may be used in addition to the cellulose nitrate, resin and the urea. Although particular cellulose derivatives have been mentioned for addition to particular compositions it will be understood that any particular derivative may be added to any of the compositions, in the amounts mentioned or in different amounts.

As mentioned above, in making the plastic, the ingredients may be combined in the usual ways of the plastic art. For example, the ingredients may be macerated and kneaded in a dough mixer with suitable volatile solvents or solvent mixture, for example ethyl acetate or acetone or a mixture of both with alcohol, following with a subsequent process of filtering, rolling, pressing and sheeting, or extruding into tubes as is usually practiced in the cellulose plastic art. It is also permissible to combine the non-volatile ingredients in any suitable manner to obtain the resulting mass in the desired form by pressure and/or heat without the presence of a volatile solvent. When solvents are used, the quantities thereof will of course depend on whether it is desired to produce the plastic in the original working, or to produce a solution which upon drying will give the plastic; e. g. 80 parts of solvent for making plastic and 400 parts for making a solution. The plastic may be used as such, ground to give a molding powder, dissolved to give a solution, etc.

In addition to the aryl alkyl sulphonamid aldehyde resin and the urea many other plasticizers and softeners may be used. Examples of satisfactory plasticizers are dimethyl phthalate, diamyl phthalate, triacetine, ethyl acetanilid, ethyl paratoluene sulphonamid, camphor, etc. or natural or synthetic resins may be incorporated. Examples of natural resins are gum accroides, gum damar, etc. Examples of synthetic resins are those of the polybasic acid-polyhydric alcohol type, etc. Instead of urea itself there may be used thiourea, guanidine or any derivatives or homologues of urea. (In the claims references to "a urea" are intended to refer to urea derivatives and homologues as well as to urea proper.)

The invention is of particular significance in connection with compositions having a sulphonamid-type resin content of 10% or more based on the weight of the cellulose derivative, since it is in these compositions that voids are particularly prone to form in the heating and pressing operation; but the invention is, obviously, applicable to compositions containing less than 10% of resin. By virtue of the invention any amount of the resin can be incorporated with the cellulose derivative without giving rise, under heat, or other adverse conditions to decomposition products, e. g. aldehyde in its gaseous state, which would cause voids and comparable defects in the plastic, it only being necessary in accordance with the invention to incorporate a suitable amount of a urea.

It will be understood that, while more particular reference has been made to compositions containing but single examples of resin, a urea, and cellulose derivative, more than one example of any or all of these may be used in a composition if desired, as more than one sulphonamid aldehyde resin and so on.

Since, as previously mentioned, the resin content of a cellulosic plastic is desirably between 10 and 150 per cent based on the cellulosic derivative, in using composition I with cellulosic derivative the derivative may desirable be from 1000 parts to 66.6 parts for each 100 of resin, in using composition II the cellulosic derivative may be from 340 to 22.6 parts per each 34 parts of resin, and so on.

I claim:—

1. The process of preparing a solid composition of matter, which comprises mixing a urea into a previously prepared sulphonamid-aldehyde resin to prevent formation of bubbles when the mechanical mixture thus formed is subjected to heat and pressure, the urea being present in amount to react on heating with 8 to 50% of the aldehyde present in combined form in the resin.

2. The process of preparing a solid composition of matter, which comprises mixing a urea into a mixture comprising a previously prepared sulphonamid-aldehyde resin and a cellulose derivative to prevent formation of bubbles when the thus-formed mechanical mixture of urea and resin is subjected to heat and pressure, the resin being present in amount by weight equivalent to 10 to 150% of the weight of cellulose derivative, and the urea being present in amount to react on heating with 8 to 50% of the aldehyde present in combined form in the resin.

3. A solid composition comprising a mechanical mixture of a sulphonamid-aldehyde resin and a urea, the urea being present in amount to react on heating with 8 to 50% of the aldehyde present in combined form in the resin.

4. A solid composition comprising a sulphonamid-aldehyde resin and a urea in mechanical mixture, and a cellulose derivative, the resin being present in amount by weight equivalent to 10 to 150% of the weight of cellulose derivative, and the urea being present in amount to react on heating with 8 to 50% of the aldehyde present in combined form in the resin.

5. A composition as described in claim 4 characterized in that the sulphonamid-aldehyde resin is specifically a toluene sulphonamid-aldehyde resin.

6. A composition as described in claim 4 characterized in that the sulphonamid-aldehyde resin is specifically a xylene sulphonamid-aldehyde resin.

BOZETECH C. BREN.